May 12, 1931.  A. H. HAVENS  1,805,396
EYESHIELD FOR SPECTACLES
Filed Nov. 20, 1928
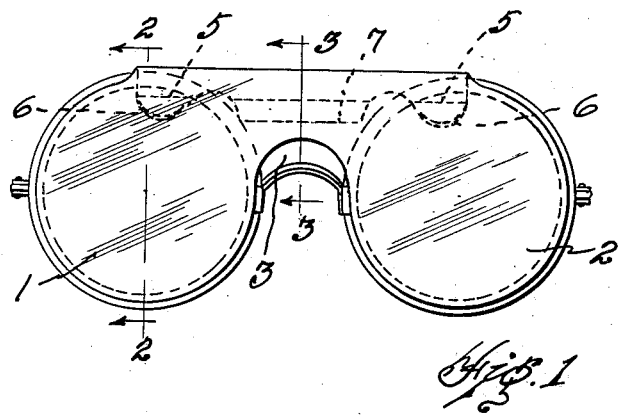
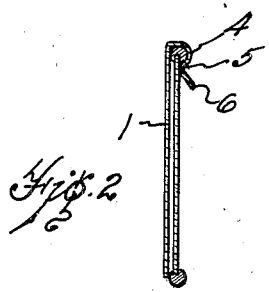
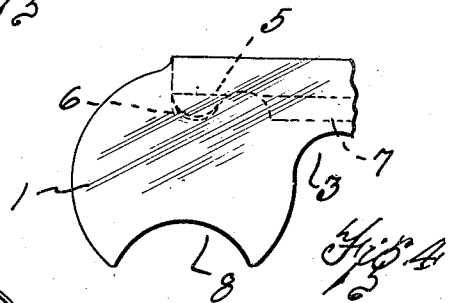
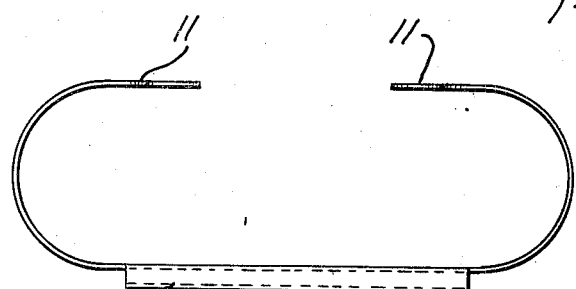
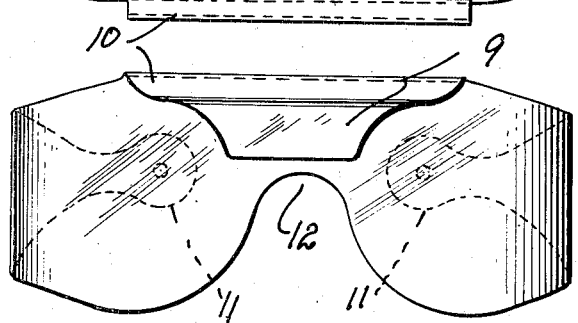
INVENTOR.
ALLEN H. HAVENS
BY
ATTORNEY.

Patented May 12, 1931

1,805,396

UNITED STATES PATENT OFFICE

ALLEN H. HAVENS, OF ST. PETERSBURG, FLORIDA

EYESHIELD FOR SPECTACLES

Application filed November 20, 1928. Serial No. 320,556.

This invention relates to eye shields for spectacles and the object of the invention is to provide an eye shield for protecting the eyes which is adapted to be clipped onto a pair of spectacles or eye glasses to shield the eyes of the wearer.

Another object of the invention is to provide an eye shield formed of celluloid or similar material of a transparent nature which may be tinted in different shades to protect the eyes of the wearer against different light conditions.

Another object of the invention is to provide an eye shield which engages firmly over the frame of the spectacles or eye glasses and is provided with a strengthening rib extending across the top of the eye glass or spectacle frame from one lens to the other.

These objects and the several novel features of the invention are hereinafter more fully described and claimed and the preferred form of construction by which these objects are attained is shown in the accompanying drawings in which—

Fig. 1 is a front elevation of an eye shield embodying my invention, as applied to a pair of spectacles.

Fig. 2 is a section taken on line 2—2 of Fig. 1.

Fig. 3 is a section taken on line 3—3 of Fig. 1.

Fig. 4 is a detail showing an alternative form of eye shield for use with spectacles having bifocal lenses.

Fig. 5 is a plan view of an alternative form of eye shield for use without spectacles.

Fig. 6 is a front elevation thereof.

As shown in Fig. 1 the eye shield is formed of celluloid and comprises two semi-circular portions 1 and 2 for covering the lenses of a pair of spectacles or eye glasses. These semi-circular portions 1 and 2 are separated by a deep notch 3 extending above the bridge of the spectacles and at the upper edge a flange 4 is provided as shown in Fig. 2 which is rolled to fit over the frame of the spectacles and a shoulder 5 is formed therein to engage beneath the frame of the spectacles to hold the eye shield thereon. The extreme ends of this flange 4 extends outwardly at 6 away from the spectacles to facilitate the positioning of the eye shield over the spectacle frame to forcing it downwardly to cause the shoulder 5 to engage beneath the spectacle frame. As will be noted from Fig. 1 a flange 6 is provided over the center of each lens of the spectacles. The flange 7 between the lenses extends parallel with the face of the eye shield and forms a stiffening or strengthening portion for the rolled flange 4. The eye shield is made of celluloid or other suitable transparent material and different eye shields may be provided tinted in different colors or smoked, if desired, to protect the eyes against different light conditions.

As the eye shields are made of celluloid in different tints it is very readily and cheaply made and being flat and of the same thickness throughout it does not effect the focus of the spectacle lenses. The use of this device is much cheaper than utilizing spectacles with differently tinted lenses and due to their ease of application to the spectacles or eye glasses the eye shield may be very easily put on or removed. In Fig. 4 I have illustrated a form in which the lower edges of the lens covering portions are provided with notches 8 for use with bifocal lenses so that in reading the eye shield does not effect the vision.

An alternative form of the device is shown in Figs. 5 and 6 in which form a flange 9 is formed on the front of the eye shield and a bead 10 is rolled into the flange 9 as shown to stiffen the eye shield along the top. This form is intended for use without glasses and is provided with curved temples 11 formed integrally with the main portion of the eye shield and these temples may be spread apart to engage the temples of the wearer with a spring tension, a notch 12 being provided to fit over the bridge of the wearer's nose.

From the foregoing description it becomes evident that the device is very simple and efficient in operation, may be readily put on or taken off from a pair of spectacles or eye glasses and provides a device which accomplishes the objects described.

Having thus fully described my invention, its utility and mode of operation, what

I claim and desire to secure by Letters Patent of the United States is—

1. An eye shield for spectacles consisting of a pair of lens cover members connected together at the upper edge by a portion integral therewith, the upper edge being provided with a return bent rolled flange, the portion of the rolled flange over each lens cover being formed with a depending shoulder of short length to clip over the respective lens frames, and the rolled flange between the shoulders being provided with a depending flat flange to stiffen the eye shield.

2. An eye shield for spectacles consisting of a pair of shield members connected together at the upper edge by a portion integral therewith, the upper edge being provided with a return bent flange extending downwardly to between the shield member to stiffen the eye shield, and having shoulders adjacent the spectacle lenses adapted to yieldably engage over the adjacent lens frames.

3. An eyeshield for spectacles consisting of a sheet of translucent material of a color to protect the eye of the wearer from glare of light, said sheet being formed with a pair of circular portions to lie over the lens of each of the spectacle glasses and an intervening portion therebetween, the upper edge of which is return bent to form a roll portion, and a depending flat portion between the eyeshields and terminal portions providing shoulders to engage the respective lens of the spectacle on the side opposite that covered by the circular portions, the tips of each of which portions or shoulders are outwardly bent from the respective lens.

4. An eyeshield for spectacles consisting of a sheet of translucent material of a tint to shield the eye from glare of light, said sheet having two portions of a form to cover the lens of each glass of the spectacle and an integral connecting portion at the top of the sheet, the lower edge of which, in the plane of the shields, is formed by a curved portion providing a space for the nose of the wearer between the shield portions and the upper edge of which is rolled to stiffen the same, each shield portion having its lower edge cut away to provide a clear portion of each glass of the spectacle below the normal line of vision.

5. A shield for the eyes consisting of a single sheet of tinted celluloid bifurcated to provide two portions covering the eyes of the wearer, and an integral rolled portion along the upper edge and a flat portion extending downwardly over the sheet and terminating short of the bifurcation.

In testimony whereof I sign this specification.

ALLEN H. HAVENS.